H. P. HIRD.
PLANT FOR THE CONTINUOUS DISTILLATION OF COAL TAR, MINERAL OILS, AND THE LIKE.
APPLICATION FILED MAY 10, 1912.

1,041,082.

Patented Oct. 15, 1912.

Witnesses,
C. Bean.
Chas M Baruch

Inventor,
Harold P. Hird.
by Herbert W. Jenner
Attorney.

UNITED STATES PATENT OFFICE.

HAROLD P. HIRD, OF NORWOOD GREEN, NEAR HALIFAX, ENGLAND.

PLANT FOR THE CONTINUOUS DISTILLATION OF COAL-TAR, MINERAL OILS, AND THE LIKE.

1,041,082.

Specification of Letters Patent.

Patented Oct. 15, 1912.

Application filed May 10, 1912. Serial No. 696,319.

*To all whom it may concern:*

Be it known that I, HAROLD PEARSON HIRD, a subject of King George V of Great Britain, residing at Norwood Green, near Halifax, in the county of York, England, have invented certain new and useful Improvements in Plants for the Continuous Distillation of Coal-Tar, Mineral Oils, and the Like, of which the following is a specification.

The invention relates to plant for the continuous distillation of coal tar, mineral oils and the like, and has for its object the provision of an improved construction and arrangement of plant by means of which the products of distillation of the coal tar, mineral oil, or the like being treated are continuously given off in different and successive fractions while the residual pitch is continuously discharged at the same time.

For the purposes of my invention, I employ, as is customary in plants of the type referred to, a plurality of horizontal stills working in series with means for condensing and collecting separately the products of distillation of the various stills, and my invention consists in an improved construction and arrangement of the plant as will be hereinafter set forth and claimed in the following claim.

Figure 1:
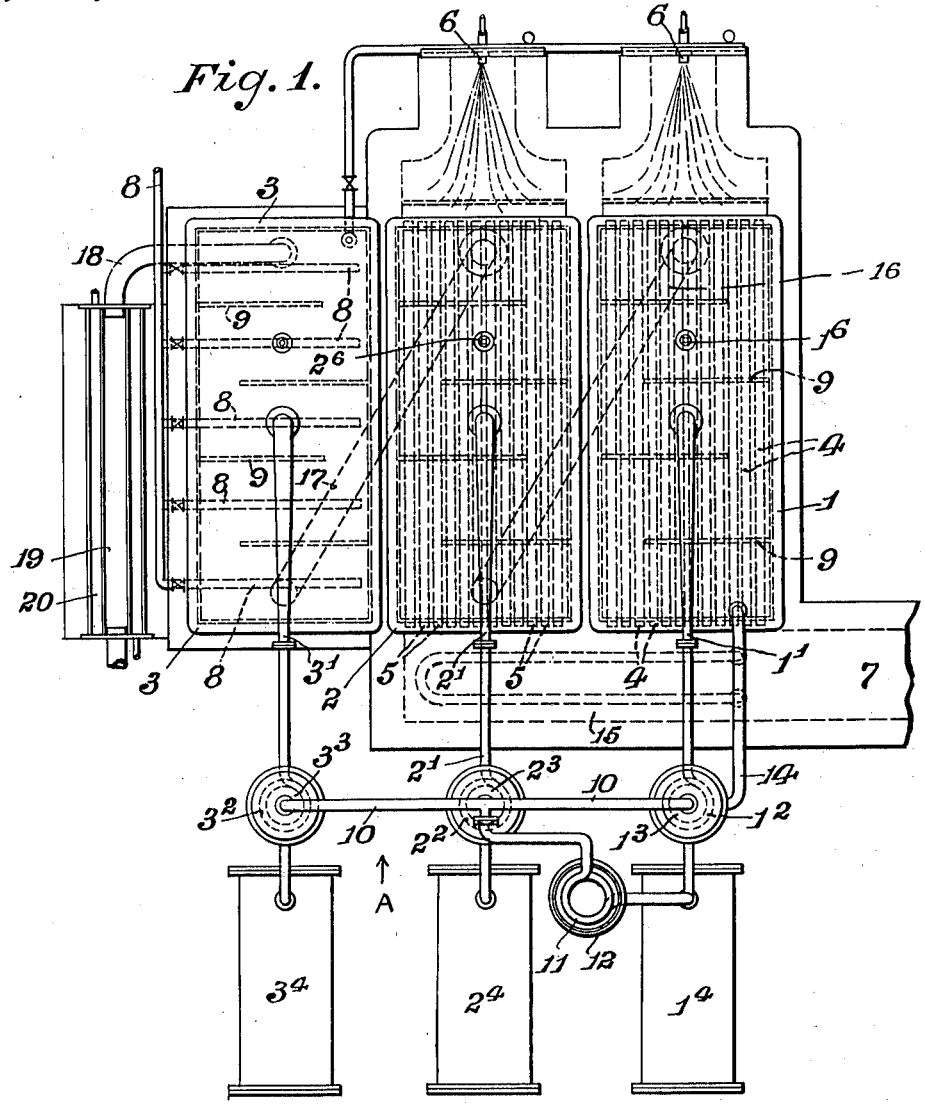
Figure 2:
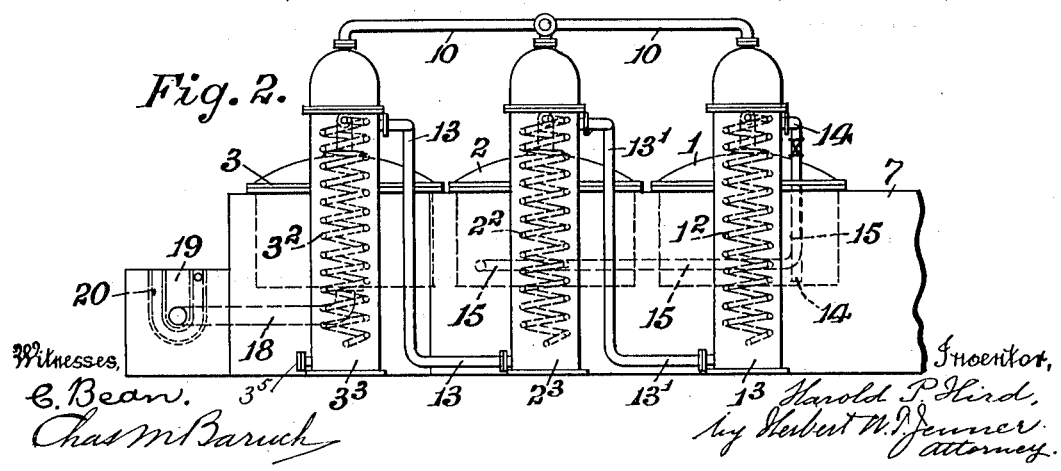

In the drawings:—Figure 1 is a plan view of an embodiment of my improvements showing a three still installation, and Fig. 2 is an elevation of part of the plant looking in the direction of the arrow A, Fig. 1.

Referring to the drawings, I employ in the embodiment illustrated three horizontal stills 1, 2 and 3, each of which preferably consists of a rectangular tank with flat bottom and flat sides and ends, the top of the still being either flat or, as shown in the drawings, slightly domed. The stills 1 and 2 are provided at or near the bottom thereof with respective series of tubes 4 and 5 extending longitudinally through the stills and being adapted to conduct through them heat provided in this instance by burning, in burners 6, 6, creosote obtained from the still 3. The products of combustion after passing through the series of tubes 4 and 5 are conducted away by means of a suitable flue 7. This method of heating by tubes gives a greater heating effect with less consumption of fuel than is obtained by the usual bottom or furnace heating and causes a brisker circulation of the liquid in the stills. The whole of the stills in the plant may be heated in the manner described but preferably the last still in the series, in this instance the still 3, is heated by means of a series of perforated steam pipes 8.

Each still is provided with a series of vertical baffle plates 9 in order that the tar or other liquid may be caused to take a zig-zag or tortuous path through the still so as to allow it to be in contact with the heating tubes for as long a time as possible, with any given rate of flow. The depth of tar in the stills is suitably proportioned to the depth of the stills and generally speaking would not exceed say fifteen inches.

Each still is provided with a separate outlet pipe 1', 2' or 3' for the products of distillation, the outlet pipes leading respectively in the instance shown to the upper ends of worms $1^2$, $2^2$ and $3^2$, each worm being located in a respective condensing chamber $1^3$, $2^3$, or $3^3$. The lower ends of the worms $1^2$, $2^2$ and $3^2$ are connected to respective chambers $1^4$, $2^4$ and $3^4$ (see Fig. 1) in which the fractional distillates are collected. The condensing of the vapors in the worms is effected by the incoming tar which is conducted through the condensing chambers on its way to the stills.

Each condensing chamber, which is preferably domed at its upper end, is provided with an outlet to a pipe 10 in which the light vapors given off by the tar or other liquid as a result of its contact with the heated worms are collected, the pipe 10 communicating with the upper end of a worm 11 in a condensing chamber 12, see Fig. 1. The lower end of the worm 11 is, in the instance shown, connected to the collecting chamber $1^4$.

The condensing chamber $3^3$ has an inlet $3^5$, see Fig. 2, near its lower end for the tar or other liquid, and the upper end of said chamber is connected by a pipe 13 with the lower end of the chamber $2^3$. A pipe 13' leading out from the upper end of chamber $2^3$ connects same with the lower end of chamber $1^3$ and a pipe 14 leading from the upper end of chamber $1^3$ and extending through the flue 7 connects said chamber, either directly or through a by-pass pipe 15 in the flue 7, with the still 1.

The still 1 has an outlet at the bottom thereof connected by a pipe 16 with an inlet at the bottom of the still 2 and an outlet at the bottom of still 2 is connected by a pipe 17 with an inlet at the bottom of still 3, while an outlet at the bottom of the still 3 connects said still by a pipe 18 with a receptacle 19 for the residual tar. In the instance shown the receptacle 19 takes the form of a trough provided with a water jacket 20 for the purpose of cooling the residuals. The stills are respectively provided with safety valves $1^6$, $2^6$ and $3^6$.

Assuming the plant to be charged and at work, the tar or other liquid is fed in through the inlet $3^5$ at the lower end of the condensing chamber $3^3$. The tar rises up in said chamber, becoming heated by contact with the surface of the worm $3^2$ and passes out of the chamber at the upper end of same. The pipe 13 then conveys the tar to the chamber $2^3$ and after passing up through said chamber the tar is conveyed by pipe 13' to the chamber $1^3$ through which the tar also rises, being thence conducted by the pipe 14 to the first still 1 either directly or by way of the by-pass pipe 15. The tar then flows through the still 1 in a zig-zag or tortuous path and is conducted through the pipe 16 to the still 2 and from thence by the pipe 17 to the still 3 from whence the residuals are conducted by the pipe 18 to the cooling receptacle 19. The tar may, however, pass through the said condensers in the reverse direction. The tar as it passes along through the chambers $3^3$, $2^3$ and $1^3$ and through the stills 1, 2 and 3 is gradually heated, the vapors given off in the chambers $3^3$, $2^3$ and $1^3$ being collected by the pipe 10, condensed in the worm 11, and conveyed in this instance into the first collecting chamber $1^4$, though preferably the distillate condensed in the worm 11, and representing the first fraction, would be separately collected. The vapors given off in the respective stills 1, 2 and 3 are separately condensed in the respective worms $1^2$, $2^2$ and $3^2$ and collected in the respective collecting chambers or receptacles $1^4$, $2^4$ and $3^4$, the distillates obtained from each succeeding still representing a higher fraction than that from the preceding still. Any number of stills, with their respective condensers and collecting chambers, may be arranged in series according to the number of fractions which it is desired to obtain from the tar or other liquid. The level of the tar in the stills can be varied at will and as the tar enters and leaves each still at the bottom by the lute pipes 16, 17 and 18, the stills are sealed from each other even when one or all is or are empty.

It will be observed that the incoming tar is made use of to effect the condensation of the respective fractional distillates with the exception that in the embodiment shown it is not led through the condensing chamber of the worm 11, which is preferably water cooled, though the tar may, if preferred, be led also through this condensing chamber which may be placed in any desired position with relation to the other condensing chambers.

Having thus described my invention, what I claim as new and desire to secure by Letters Patent is:—

In a distilling apparatus, the combination, with a series of stills provided with heating devices and arranged one after another in regular order, of a corresponding series of condensing chambers each provided with a worm, separate pipes connecting the vapor space of each still with one end of the worm pertaining to it, a corresponding series of collecting chambers, a series of pipes each connecting a collecting chamber with the other end of the worm pertaining to it and which is connected to the still pertaining to it as aforesaid, pipes and connections for conducting the liquid to be distilled through the condensing chambers in the reverse order of the series of stills pertaining to them and thence from one still to another in the regular order of their arrangement, the liquid being caused to enter first the condensing chamber pertaining to the last still of the series and to escape finally from the last still of the series, and a separate condensing chamber provided with a worm which is connected to the vapor spaces of all the aforesaid condensing chambers and which is cooled by means independent of the liquid to be distilled.

In testimony whereof I affix my signature in the presence of two witnesses.

HAROLD P. HIRD.

Witnesses:
THOMAS H. BARRON,
ELSIE M. GLEDHILL.